(No Model.)
E. S. WILLIAMS & J. E. HARDER.
SHEAF CARRIER FOR HARVESTERS.
No. 291,118. Patented Jan. 1, 1884.
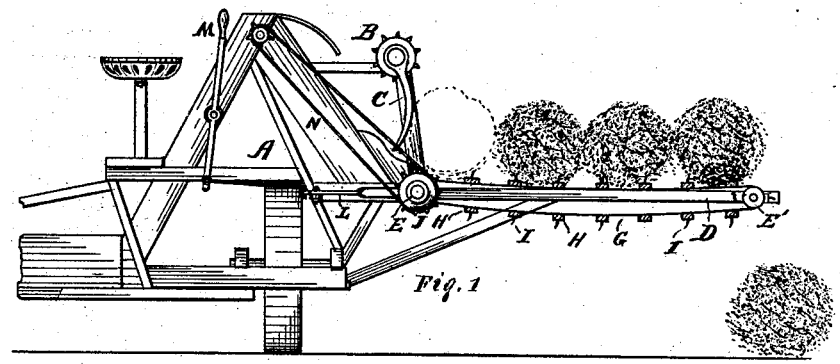
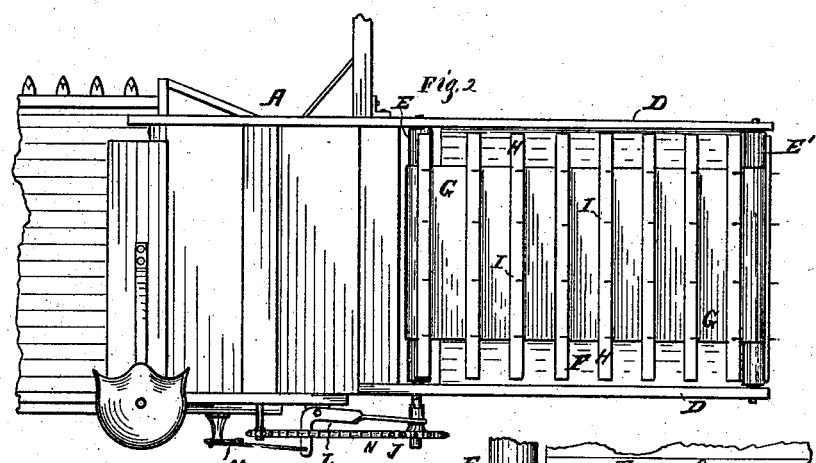
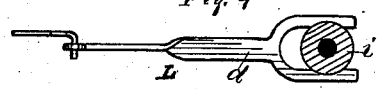
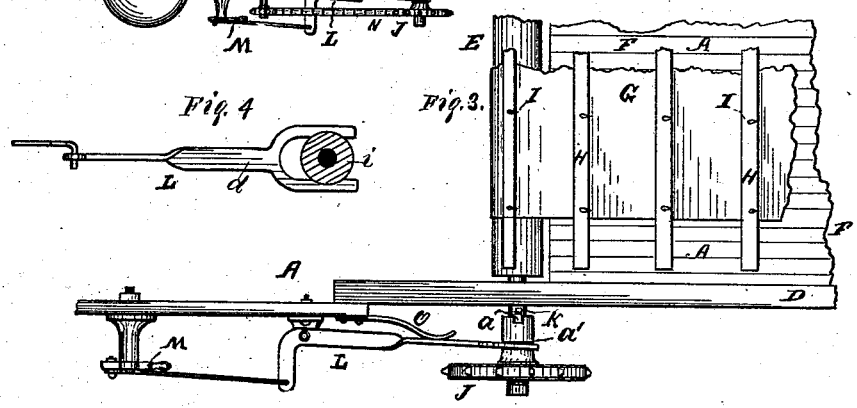
Attest. Inventors.
Edwin S. Williams
James E. Harder.
By F. F. Warner
their Atty.

UNITED STATES PATENT OFFICE.

EDWIN S. WILLIAMS, OF HOWARD, AND JAMES E. HARDER, OF NILES, ASSIGNORS OF ONE-THIRD TO A. V. CLELAND, OF NILES, MICHIGAN.

SHEAF-CARRIER FOR HARVESTERS.

SPECIFICATION forming part of Letters Patent No. 291,118, dated January 1, 1884.

Application filed February 21, 1883. (No model.)

*To all whom it may concern:*

Be it known that we, EDWIN S. WILLIAMS, of Howard, in the county of Cass and State of Michigan, and JAMES E. HARDER, of Niles, in the county of Berrien, in said State, citizens of the United States of America, have jointly invented certain new and useful Improvements in Sheaf-Carriers for Harvester-Binders, of which the following, in connection with the accompanying drawings, is a specification.

In the drawings, Figure 1 is a rear view of that part of the grain-binding harvester to which our sheaf-carrier is applied, and showing the carrier attached to the harvester. Fig. 2 is a top or plan view of the parts shown in Fig. 1. Fig. 3 is a like representation, showing a part of the carrier attachment enlarged; and Fig. 4 is a detail of the clutch and its shifting-lever.

Like letters of reference indicate like parts.

A represents the rear portion of that part of a harvester to which the automatic binding mechanism and the sheaf-carrier are usually applied.

B in the example shown represents a portion of the binding mechanism. We have not here attempted to show and describe with particularity the construction and operation of a harvester provided with automatic grain-binding mechanism, as the construction and operation of that class of agricultural implements are well known. Our invention, however, is adapted for operation with binding mechanism working automatically in conjunction with discharge-arms for discharging the bound sheaves, and C represents such an arm or sheaf-discharger.

All the parts now referred to are old and well known, and we make no special claim thereto.

D D are parallel bars or arms projecting laterally from the harvester.

E and E' are rollers having spindles turning in the bars D D, or in suitable bearings or boxes. These rollers are arranged, one near the outer ends of the arms D D, and the other near a point underneath the sheaf-liberators and extend parallelly from one bar D to the other.

F is a platform or floor arranged between the rollers E and E' and between the bars D D, which latter support the said floor or platform.

G is an endless apron carried by the rollers E and E'.

H H are transverse slats attached to the outer side of the apron G and arranged at suitable distances apart thereon.

I I are short pins or slightly curved studs secured to and projecting outwardly from the slats H H.

We desire to state that the apron G will perform its functions, although not with the best results, if the floor F, slats H H, and studs I I are not employed in connection therewith; but we employ them as auxiliaries, the floor to prevent too great slack of the apron, the slats to prevent the sheaves from rolling too easily on the apron, and the studs I I to aid in causing the sheaves to travel with the apron, all of which will hereinafter more fully appear.

J is a sprocket-wheel mounted loosely on one of the spindles of the roller E, and capable of sliding laterally thereon, and *a* is a notch made in the inner edge of the hub of the wheel J. A groove, *a'*, annular in form, also extends around the perimeter of the said hub.

K is a pin or lug on the spindle of the roller E, and this lug is adapted and arranged to engage the notched hub of the wheel J, as the latter is moved laterally toward the said lug.

L is a bent lever or bell-crank pivoted near its angle to a support applied to the frame of the harvester. The end of the long arm of the lever L is forked, and enters the groove *a'*.

M is a lever pivoted near its center to the frame of the harvester. The lower end of the lever M is linked or connected to the end of the short arm of the lever L, and the upper end is in proximity to the driver's seat, so that it may be conveniently grasped by the driver. This lever, however, may be adapted and arranged to be controlled also by the foot of the driver.

The operation of the sheaf-carrier is as follows: As a bundle or sheaf is discharged from the binder, the bound bundle falls upon the apron G, and rests thereon near the inner end thereof. As the next sheaf is discharged, it falls against the sheaf already on the apron, and its momentum causes the apron to move toward the roller E', carrying the sheaves with it, so that the next succeeding sheaf may be deposited, in like manner, upon the apron. We do not depend, however, entirely upon the momentum for moving along the apron with its load, for the sheaf-discharger will strike the rear sheaf on the apron, and thus push it along with its load positively, it being understood that thus far the hub of the wheel J does not clutch the pin K. The length of the apron G is intended to be such as to hold about four bundles at a time. After the desired number of sheaves are thus deposited upon the apron, the driver draws the upper end of the lever M toward him, thus throwing the hub of the wheel J into engagement with the lug K, and thereby rotating the axle E, so that all the sheaves will be discharged at once, and deposited together upon the ground, the apron being thus moved quickly toward the roller E'. It should also be understood that the wheel J rotates constantly, being driven by suitable gearing employed for that purpose. In the example shown a drive-chain, N, passes over the wheel J, and over a wheel, J', which is in constant rotation while the harvester is at work. After the sheaves have thus been deposited on the ground, the driver releases the clutch by pushing the lever M to its original position, when the sheaves will be deposited upon the apron, as before. The clutch, however, may be released automatically by means of a spring, O, adapted to exert itself with that result as soon as the lever M is released by the driver.

It will be perceived that the labor of gathering the sheaves or shocking will thus greatly be diminished, as a number of sheaves are dumped together in the same place upon the ground, each pile being distant from the others and in place for being shocked, instead of each sheaf being deposited separately and at a distance from each of the other sheaves.

The means employed for depositing a number of sheaves together or at the same place upon the ground is simple in construction and operation, and may be applied with facility to harvesters of well-known construction and operation, and the gatherer is fully under the control of the driver.

While we have shown rotary discharge-arms C C, we desire to state that horizontally-reciprocating arms have also heretofore been employed for discharging the bound sheaves, and that, as to details, the discharging mechanism has been made in various ways, the bundle, however, after being gathered, compressed, bound, and liberated, being discharged by mechanism operating positively. Our improvements are adapted to co-operate with discharging mechanism operating in this positive manner.

Having thus described our invention, what we claim as new, and desire to secure by Letters Patent, is—

1. In a harvester-binder, the combination, with the sheaf-discharging mechanism, of an endless apron mounted on rollers and arranged to receive at one end the bound sheaves from said discharging mechanism and deliver them at the other end, the said apron being adapted to be moved by the force of the discharging mechanism as each sheaf is discharged from the latter, the operating-gear of the harvester, and means for throwing the driving-roller of the said apron in and out of gear with the operating mechanism or gear of the harvester, substantially as specified, and for the purposes set forth.

2. In a harvester-binder, the combination of the discharge-arms C C, the endless apron G, mounted on rollers and arranged as specified with relation to the said arms, the said apron being adapted to be moved by the force of the discharging mechanism as each sheaf is discharged from the latter, the operating-gear of the harvester, and means for throwing the driving-roller of the said apron in and out of gear with the operating mechanism of the harvester, the said means consisting, essentially, of a clutch controlled by means of a lever adapted and arranged to be shifted by the driver, substantially as and for the purposes specified.

3. In a harvester-binder, the combination of the discharge-arms C C, the endless traveling apron G, arranged to receive at one end the bound sheaves from the said arms and deliver them at the other end, the said apron being adapted to be moved by the said arms while in contact with the bundle last deposited upon the apron, the loose sliding wheel J, provided with its notch a, the engaging-lug K, gearing for rotating the said wheel, and the levers for throwing the said wheel in and out of gear with the said lug, substantially as and for the purposes specified.

EDWIN S. WILLIAMS.
JAMES E. HARDER.

Witnesses:
H. D. NORRIS,
H. W. CLELAND.